July 17, 1962 C. L. MURDOCK 3,044,461
PROCTO-SIGMOIDOSCOPE
Filed Jan. 21, 1960 4 Sheets-Sheet 4
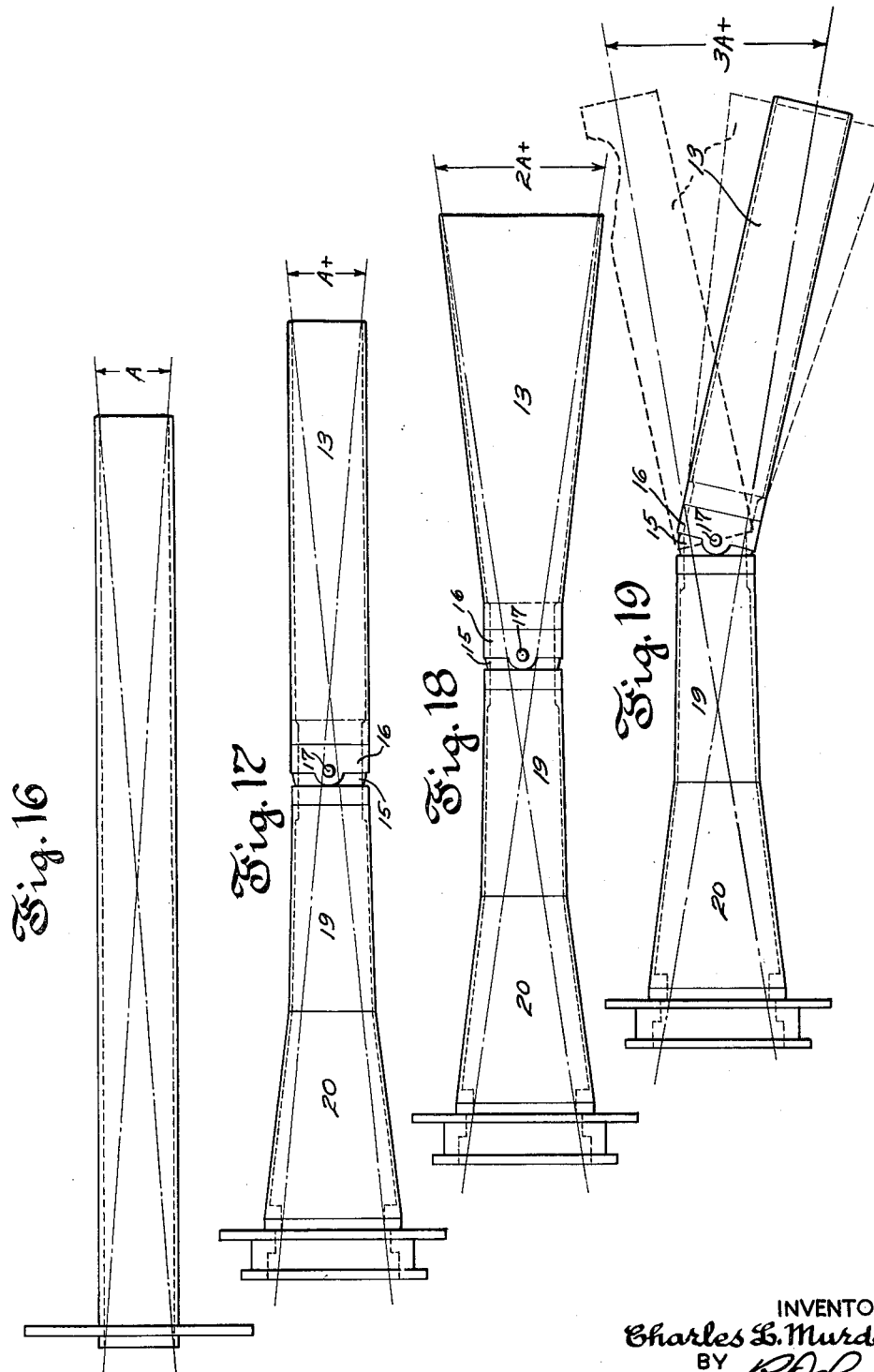
INVENTOR
Charles L. Murdock
BY
ATTORNEY

United States Patent Office 3,044,461
Patented July 17, 1962

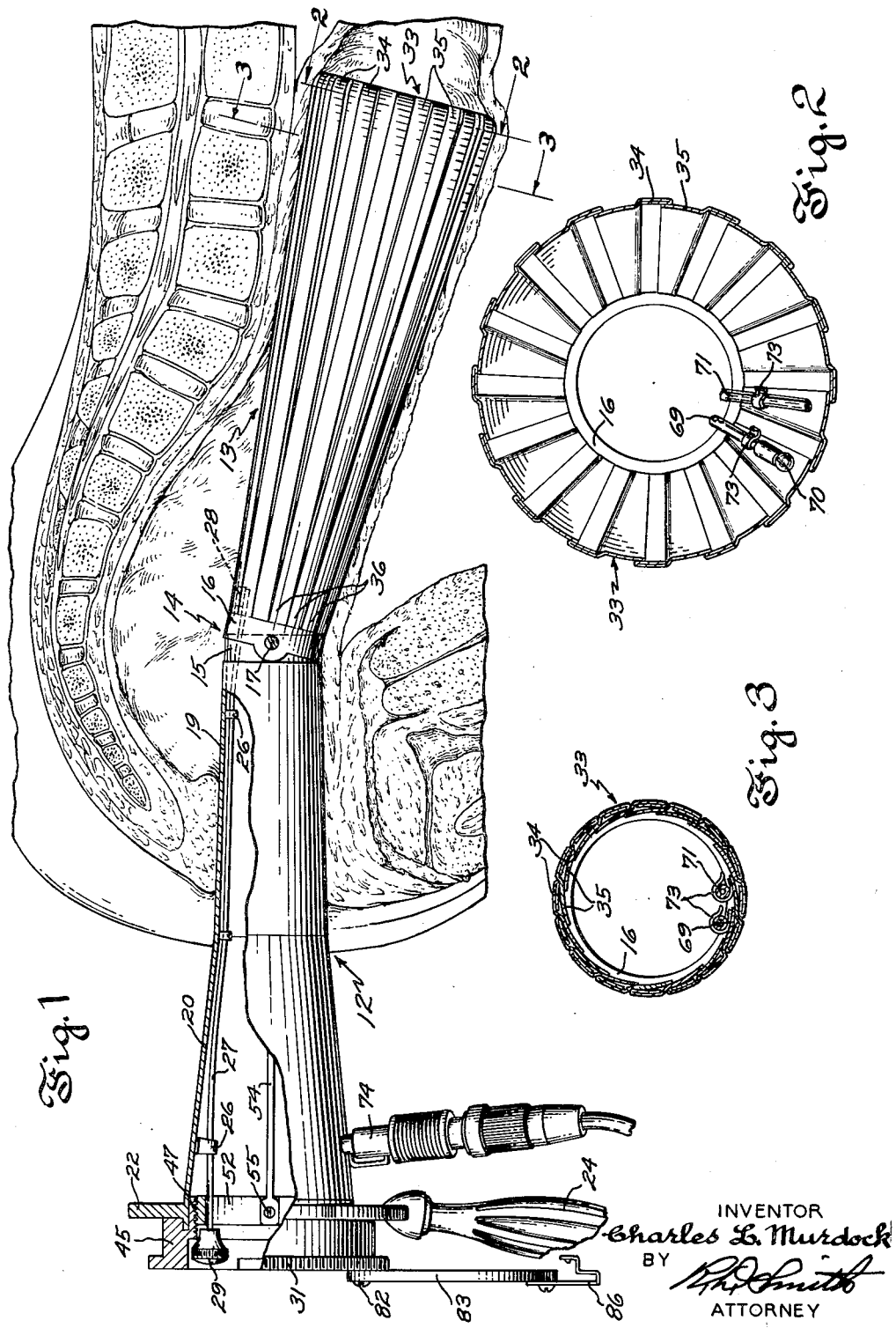

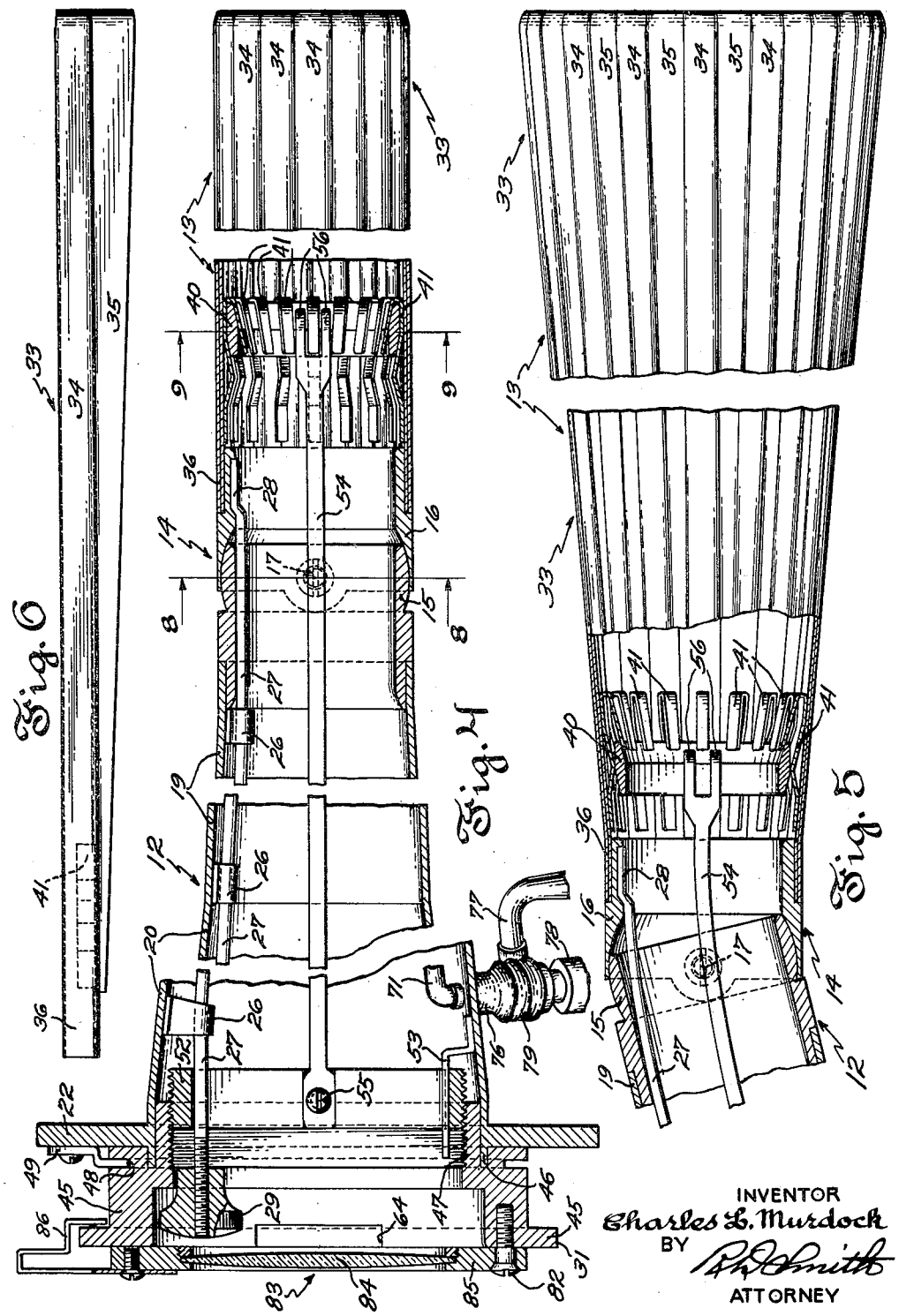

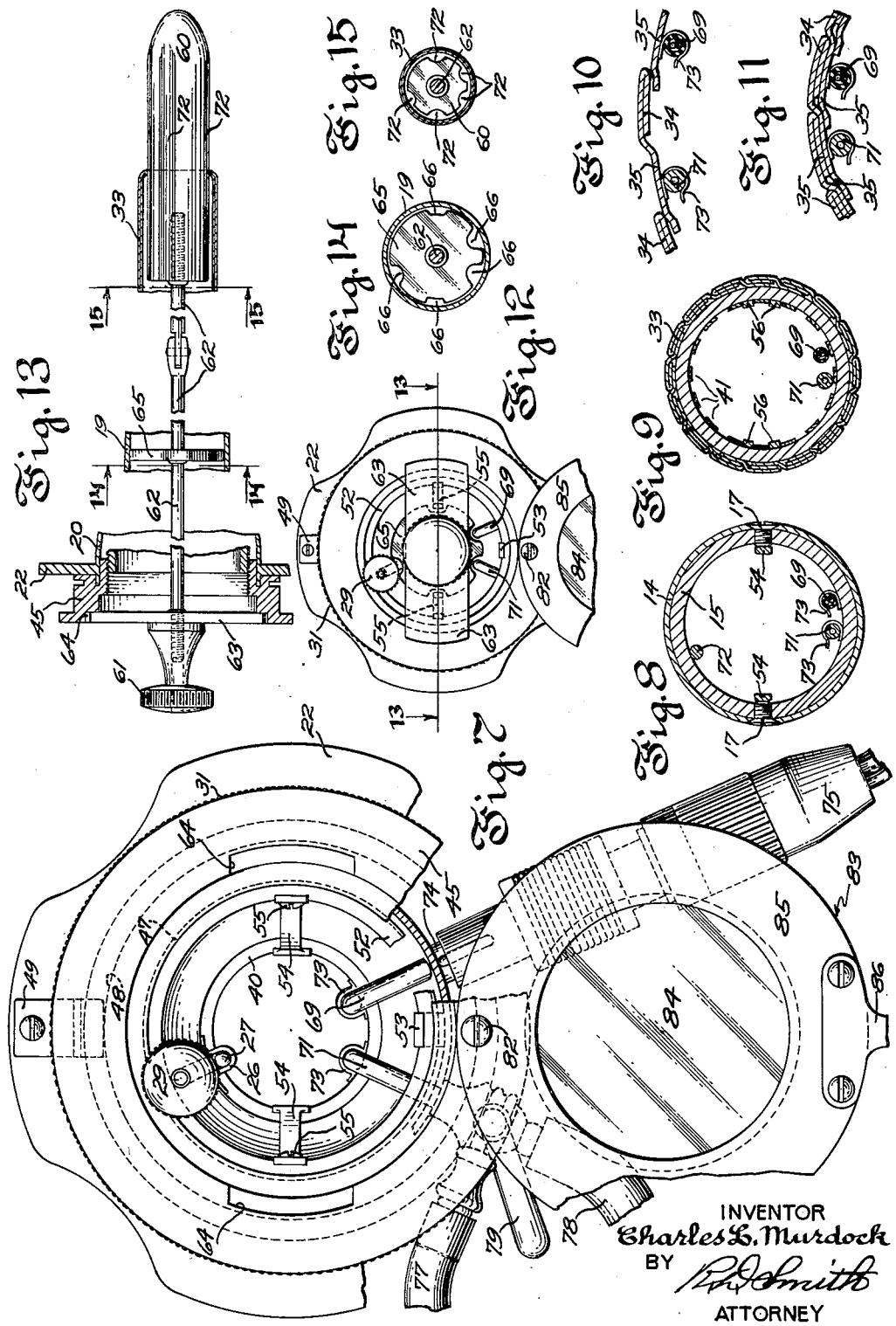

3,044,461
PROCTO-SIGMOIDOSCOPE
Charles L. Murdock, West Redding, Conn.; Barbara Murdock, executrix of said Charles L. Murdock, deceased
Filed Jan. 21, 1960, Ser. No. 3,935
20 Claims. (Cl. 128—4)

This invention relates to instruments of the proctoscope type designed to give access in bronchoscopy, esophagascopy, cystoscopy, vaginal speculi and comparable procedures for diagnosis and surgery in an elongate body cavity especially when of curved shape such as the sigmoid flexure.

Tubular instruments termed endoscope sheaths have been proposed for this use some of which are flexible throughout their length and capable of accommodating themselves to curves of a body cavity. For lack of mechanical control of their curvature such sheaths can defeat straight-line sighting therethrough from end to end. Also such sheaths when curved fail to admit therethrough an implement for surgical treatment that must be rigid in its length such as a cautery, snare or biopsy forceps.

To avoid these difficulties endoscope sheaths are in use which are rigid from end to end. Because for sighting therethrough they must be straight and small in girth they afford a much too limited scope of access for observing and treating tumors, diverticula, colitis and other afflictions of the sigmoid flexure. Also straight rigid proctoscopes prove painful and difficult of insertion in the sigmoid flexure. They may cause accidental perforation of the wall of the colon.

In the manipulation of inserted rigid sheaths the only fulcrum upon which the sheath can be tilted is at the anus. This results in poor leverage for manipulation and difficulty arises in changing the position of the instrument during and after insertion. Also when once in place, the distal end of the instrument is apt to become displaced from the field of surgery on which it is focused particularly when disturbed by attaching an electric connection for the light bulb or a conduit connection for air and suction. Such displacement requires relocation of the instrument and loss of time in completing the surgery. It is an object of this invention to avoid these shortcomings of endoscope sheaths as heretofore known by providing a procto-sigmoidoscope whose construction permits enlargement and control of the girth of the distal end of the instrument by manipulating means of control located at the proximal end of the instrument while the distal end remains fully inserted in the body cavity.

Another object is to provide ability for the inserted sigmoidoscope to undergo bending at a point within the body cavity and intermediate the length of the instrument which bending is likewise subject to precision of manual control at the proximal end of the instrument thereby to aid in the easy passage of the distal end through the sigmoid flexure and to enable the shape of the inserted instrument better to accommodate itself to the curvature of the sigmoid flexure.

Another object is to provide for use with an instrument having the above improvements an obturator which can be placed at and withdrawn from the distal end of the instrument at will by means of a control handle accessible at the proximal end. The obturator preferably is made of clear transparent material, such as Pyrex, to permit clear visibility while inserting the instrument.

Still another object is to provide means for so placing and withdrawing the obturator while the tube is inserted and either straight or bent.

The foregoing and other objects of the improvements will become apparent from the following description of a successful embodiment of the invention having reference to the appended drawings wherein:

FIG. 1 is a view of the improved procto-sigmoidoscope in use with a portion of its tubular wall shown broken away to disclose the interior controls.

FIG. 2 is an enlarged view taken in section on the plane 2—2 in FIG. 1 looking in the direction of the arrows, the distal end of the instrument being fully expanded in girth.

FIG. 3 is a view drawn on the same scale as FIG. 2 and taken in section on the plane 3—3 in FIG. 1 looking in the direction of the arrows, the distal end of the instrument being fully contracted in girth.

FIG. 4 is a view in elevation drawn on the same scale as FIGS. 2 and 3 taken partially in diametral section showing the unbent instrument shortened in sections of its length and with its distal end fully contracted in girth.

FIG. 5 is a fragmentary view mainly of the distal portion of the instrument of FIG. 4, when bent and flared to its conically expanded girth.

FIG. 6 is a detail of one of the feathering blades in the expandible portion of the proctoscope detached from the instrument.

FIG. 7 is a view looking axially at the proximal end of the instrument in FIG. 4, the lens being swung aside.

FIG. 8 is a view taken in section on the plane 8—8 in FIG. 4, looking in the direction of the arrows.

FIG. 9 is a view taken in section on the plane 9—9 in FIG. 4 looking in the direction of the arrows.

FIG. 10 is a much enlarged fragmentary view of overlapping blades at the distal end of the instrument when expanded in girth as in FIG. 2.

FIG. 11 shows the altered relationship of the same blades in the circumferentially contracted condition of the instrument shown in FIG. 3.

FIG. 12 is an endwise view looking from the left at FIG. 1 showing the control handle of an obturator lodged in place.

FIG. 13 is a view showing in diametral section fragments of the length of the instrument occupied by an obturator whose head portion projects from the distal end of the proctoscope when the latter is fully contracted in girth as in FIG. 3.

FIG. 14 is a view taken in section on the plane 14—14 in FIG. 13 looking in the direction of the arrows.

FIG. 15 is a view taken in section on the plane 15—15 in FIG. 13 looking in the direction of the arrows.

FIGS. 16 to 19, inclusive, illustrate diagrammatically the increase in field of vision and in angular range of access for surgical instruments made possible by these improvements.

As is apparent from FIG. 1 the improved procto-sigmoidoscope is comprised of two portions or units approximately equal in length having their axes end-to-end and that can swing relatively to a restricted degree and thereby produce a bend in the instrument about midway its length. That portion 12 of the length of the hollow structure of the instrument that extends to the exterior of a body cavity into which the instrument is to be inserted is termed the proximal portion and has an entrance mouth. The remaining portion 13, intended to occupy the body cavity when in use, is termed the distal portion. These end to end portions of the overall length of the hollow structure have tubular walls pivotally coupled together by a hinge joint 14 of ball-and-socket nature which enables the distal portion 13 to swing as a whole relatively to the rigid proximal portion 12 on only a common axis diametrically or secantly disposed crosswise of the aforesaid tubular walls. As shown in FIGS. 4 and 5 the hollow ball member 15 of the hinge joint 14 has an external surface of spherical curvature while the hollow socket member 16 is shown as a rigid ring forming a terminal of the distal portion having an internal surface of slidably fitting spherical curvature. As best shown in FIG. 8, two diametrically opposite coaxial shoulder screws 17 serve as separate hinge pins to pivotally connect the walls of the interengaged ball-and-socket members 15 and 16, each of these hinge pins passing through a clearance hole in the wall of the socket member 16 and threading into the wall of ball member 15. Screws 17 have head surfaces that conform as closely as possible to the contours of the external surface of the socket member and an overall length no greater than the combined thicknesses of ring 16 and the tubular wall 15 (see FIG. 8) so as to avoid any projection that can harm the tissues of the body cavity into which the pivotal joint 14 enters when the sigmoidoscope is inserted. FIGS. 16–19 show that the pivotal axis of the hinge joint 14 intersects both of the relatively inclinable axes of the tubular units 12 and 13.

The proximal portion 12 of the instrument has rigid tubular walls of frusto conical and differing tapers housing an entrance passageway through the sigmoid flexure. The degree of taper is quite gradual in approximately that half 19 of the length of proximal portion 12 that is fixedly joined to the ball member 15 of the pivotal joint 14. The joinder is made secure by riveting, brazing or other method of bonding. The taper in length 20 of the proximal portion becomes more divergent as it extends to an annular flange 22 surrounding the entrance mouth of the instrument. A radially extending handle 24 is removably attached rigidly to flange 22 near the terminal opening of unit 12 and affords convenient leverage for nicely maneuvering the instrument when inserting and positioning it for use.

The wall 19, 20 in proximal portion 12 of the instrument is internally equipped with longitudinally aligned slide bearings 26 which serve to guide a somewhat flexible push-pull bending control rod 27. At its end 28 rod 27 is operatively fastened to the internal surface of socket member 16 in such manner that when pushed or pulled it exerts torque tending to swing socket member 16 relatively to proximal portion 12 about the pivot screws 17. A restricted degree of bending of the instrument will result as illustrated in FIGS. 1 and 5. Such bending can take place in either direction of incline from the straightaway alignment of the proximal and distal portions shown in FIG. 4 depending on whether control rod 27 is pushed or pulled by means of its finger knob 29. The knob can be unscrewed and removed from the rod when desired.

The distal portion 13 of the instrument is articulate and of feathered or segmented construction and comprises a normally cylindrical assemblage of relatively movable components herein illustrated as very thin blades 33 which individually taper in width as shown in FIG. 6 and form a circumferentially continuous and gapless tubular wall completely encompassing a continuation of the passageway through proximal unit 12. Each blade has one of its longitudinal margins folded over to afford in such margin a stem 34 of double thickness and increased rigidity in comparison with the greater flexibility of the remaining single thickness in the vane portion 35 of the blade. The thickness of the stretch inhibiting sheet material of which the blade is made need be only a few thousandths of an inch if the material is metallic such as chrome plated German silver, stainless steel, spring brass or Phosphor bronze and will preferably be thicker if molded of a thermoplastic or thermosetting plastic substance in which case the stem 34 may be shaped in a mold instead of by the folding over of sheet material. Also the stem 34 may be produced by securing or bonding together separate sheets of material in laminated fashion. Each blade needs to be resiliently flexible along its length and also crosswise its length for purposes to be explained.

The butt ends 36 of the stems of the blades are fixedly secured edge to edge in a circular series on the cylindrical surface of a rabbet on the external surface of the hollow socket member 16 as by brazing or any bonding process that is certain to insure against the blades accidentally becoming loosened. They are thus mounted with sufficient holding strength to withstand without loosening any flexure that can be imposed on the sheet material of the blades that is free of their fastening to the socket member 16.

The construction which has been illustrated and described produces a composite tubular wall in the distal portion of the instrument that can undergo conical expansion of its girth evenly from the pivotal joint 14 to the distal end of the instrument. To effect and maintain any desired degree of such expansion within the limits of relative movement of the ball-and-socket members, actuating devices are provided that are mechanically associated with the tubular walls of both the distal and proximal portions 12 and 13 entirely inside the instrument. These actuating devices comprise a rigid cam ring 40 that is constantly in camming engagement with the spaced apart cammable surfaces of a circular series of rigid clips 41 which are of recurvate or hairpin shape and fixed respectively on the inside surfaces of the blades 33. The U-shaped portions of all the clips 41 are engaged by the single camming ring 40 at a point in the length of the instrument spaced sufficiently far from the socket member 16 of the pivotal joint to effect simultaneous flexure of each blade in its portion between the camming ring and the socket member. Such flexure, if in an outward direction, will cause the remaining length of the blades to incline evenly outward to the terminals of the blades at the extreme distal end of the instruments. This produces a flaring of the composite wall of the distal portion of the instrument to any desired degree of tubular taper from its normally cylindrical shape in FIG. 4 to its approximately conical shape in FIG. 5. When forced toward the hinge joint, ring 40 performs a camming action against the clips 41 that causes simultaneous flexure of the blades radially outward to expand the girth of distal portion 13. When forced toward the distal end of the instrument, ring 40 will perform a camming action that causes simultaneous flexure of each blade inward thus contracting or restoring the girth of distal portion 13 to its original cylindrical shape and size shown in FIG. 4.

FIGS. 2, 3, 10 and 11 make clear that circumferential sliding takes place between overlapping blades throughout the free length of the blades in order to accommodate changes of girth. In FIGS. 3 and 11 the resilient blades are permitted to bow normally to a relatively acute crosswise curvature so as to conform to one another snugly in their smallest circle of overlapping shown in FIGS. 3 and 9. The closely overlapping resilient blades have a constant yieldable self tendency to oppose flattening crosswise so that they remain snugly in surface to surface conformity at all stages of sliding circumferentially to their less overlapped condition in FIG. 2. There is no point in the entire length of the distal portion of the instrument where the blades gap or fail to overlap whatever may be the degree of expansion of girth imparted to the distal portion by the camming ring 40.

For actuating camming ring 40, flange 22 carries a ferrule 45 which has an annular groove in its flat rear face engaged by a circular rim 46 on flange 22. The ferrule has a barrel portion 47 that is internally screw threaded and has a peripheral groove 48 engaged for retention in an axial direction by stationary brackets 49 detachably mounted on the flange 22 and occupying the groove 48 so that ferrule 45 is free to rotate on flange rim 46 yet is removable at will from the proximal end of the instrument. In screw threaded engagement with barrel 47 there is an externally threaded nipple 52 which is kept from rotating by a stationary key bracket 53 fastened on the wall 20 so that it slidably engages an internal keyway in nipple 52 and keeps the latter from turning while permitting the nipple to move freely in an axial direction in response to turning of ferrule 45 relatively to flange 22. Ferrule 45 has a knurled head 31 that is spaced axially from flange 22 to be accessible for finger grasp whereby it can be turned to cause with precision the axial movement of nipple 52.

Axial movement of nipple 52 is transmitted to the camming ring through two slightly flexible push-pull links 54 on diametrically opposite sides respectively of the passageway through the instrument. Each of these links has one end removably secured to nipple 52, as by a screw 55, and has a forked opposite end 56 that reaches and is secured to the camming ring 40 by straddling one of the cam clips 41 in a manner not to interfere therewith.

As is necessary for the safe introduction of an open ended tube into an elongate body cavity, the present invention includes an improved obturator shown in FIG. 13 specially constructed to adapt it for use with the instrument of FIG. 4. The transparent tip 60 of the obturator, which may be molded Pyrex or spun glass or other smooth surfaced transparent or translucent hard material, is tapered and correctly curved to facilitate passage through the sphincter muscle and past the prostate gland region as the instrument is being inserted. It removably plugs the open distal end of the instrument when the latter is fully contracted in girth as in FIG. 4. After insertion the obturator may be withdrawn by means of its handle 61 connected to the obturator tip by rod 62. Rod 62 is hinged to permit free bending at a proper location in its length in the close neighborhood of hinge joint 14 to accommodate its own bending to the bending of said instrument as a whole at the hinge joint. To permit free vision from the entrance mouth of the instrument through the transparent tip 60 of the obturator to the lesion or field of surgery, the handle 61 fixedly carries a narrow mounting crossbar 63 that can be lodged removably in diametrically opposite segmental recesses 64 in ferrule 45. The sectors of radial space between bar 63 and the boundary of the circular opening through nipple 52 afford the free vision referred to while the obturator is in place in the instrument. Bar 63 may fit with a taper in recess 64.

At one or more suitable points in its length, rod 62 fixedly carries a transparent centralizing disc 65 whose perimeter is notched at points 66 to clear such through-elements as rod 27, links 54, and such service lines as flexible electrical conductors 69, leading to a lens protected lamp bulb 70 at the distal end of the instrument and a flexible fluid conduit 71 having an open terminal at the distal end of the instrument. The external surface of obturator tip 60 is correspondingly grooved with flutes 72 to prevent interference with the aforesaid through-elements when withdrawn toward the proximal end of the instrument. The obturator head or tip 60 must also be of a size to clear and pass the cam clips 41 and its overall girth with the exception of flutes 72 snugly fits the reduced opening at the fully contracted extreme distal end of the instrument. The terminal edges of the blades 33 are rounded inward to merge smoothly with the external surface of the obturator tip and avoid cutting any tissue of the colon, while the flutes 72 afford passageway for air from the instrument to be forced past the obturator head for distending the bowel ahead of the instrument to permit easier insertion thereof.

Flexible, insulated, electrical conductors 69 and flexible conduit 71 are held against the inner surface of the tubular wall tof the instrument by clips 73 with sufficient looseness to permit longitudinal slippage of the conductor and conduit through the clips. In the wall 20 near the proximal or entrance mouth of the instrument there is a fitting 74 constructed to afford quick detachable electrical connection of an attachment cord plug 75 to the conductors 69.

Angularly spaced from fitting 74 another fitting 76 in wall 20 gives fluid passage through said wall and is constructed to afford detachable joinder of conduit 71 with outside fluid supply and drain tubes such as 77 and 78.

These are given optional and/or selective modulated conduit communication with conduit 71 under control of a three-position or Y-valve 79. Thus air or liquids can be led into or out of the instrument so that effects of air inflation of the colon, removal of smoke from cauterizing, insufflation, flushing, etc., can be performed with no harmful disturbance of the instrument after being inserted.

For sealing air tight the proximal mouth of the instrument, there is hinged on ferrule 45 at 82 a circular window 83 which, when swung to its mouth closing position shown in FIG. 4, covers and seals airtight the entire entrance opening through ferrule 45. Window 83 comprises a magnifying lens 84 set in an annular frame 85 which has fixed thereon a radially projecting spring detent clip 86. Clip 86 loops over the knurled circular head 31 of ferrule 45 and detainingly engages the rear face of said head. Window 83 is shown swung to a retracted position in FIGS. 7 and 12.

When the instrument is used in diagnosis and surgery, as to observe and treat tumors, diverticula, colitis and many other conditions in regions which cannot be seen or treated otherwise in the lower ten inches of the large colon from the anus, the obturator tip 60 is first plugged into the fully contracted distal end of the instrument so as to project therefrom as shown in FIG. 13. The ability to see through the obturator tip does away with the dangerous blindness of insertion which has characterized the use of sigmoidoscopes as theretofore known. Passing of the instrument through the sigmoid flexure is aided by manipulation of the bending control handle 29 so that the distal portion works its way with facility along the curves of the colon above the rectum. When the instrument is inserted to an intended depth the obturator is readily withdrawn without dislocating the established position of the distal end from a lesion or field of surgery. The distal portion 13 can now be expanded by turning the ferrule 45. This enlarges the field of vision and the area accessible to surgical instruments that may now be passed through the instrument from its proximal mouth. Such expansion also smoothes out and stretches the surface of the colon, removing folds and wrinkles which for lack of detection could be missed if hidden by such folds.

At any stage of an operation the conduit tube 71 affords inlet or outlet for treatment fluids and for air under pressure to dilate the surgical field when the window cover 83 is in place. All work is effectively illuminated at all times by the lens protected, electric lamp bulb 70.

Because of its novel ability to be bent and expanded in girth under close control during insertion and surgical procedure, the present improvements eliminate many of the aforementioned hazards and difficulties that are encountered in practical surgery. For illustrating the advantageous increase in scope and range of surgical access to an elongate body cavity that is made possible by these improvements the scope and range of such instruments heretofore proposed may be considered as that of the area of a circle whose diameter is designated A in FIG. 16. FIG. 17 shows that the conical flare 20 alone at the proximal end of the instrument increases the accessible area to that of a circle whose diameter is greater than A, while the further ability of the distal end of the instrument to flare as shown in FIG. 18 greatly increases the accessible area to that of a circle whose diameter is nearly triple the distance A. The further ability of the instrument to bend in either direction then extends the range of surgical access at the distal end of the instrument to the possible distance of nearly four times the dimension A.

The principles of construction and arrangement of parts which yield the aforesaid advantages may be embodied in forms differing widely from the particular structures that are herein disclosed merely to illustrate a successful embodiment of the invention, wherefore the appended claims are directed to and intended to cover all equivalents for the exact recital of the claims which come within a broad interpretation of the wording thereof.

The invention claimed is:

1. A surgical instrument of the procto-sigmoidoscope type adapted for smooth insertion through the sigmoid flexure and affording enlargeable access to the interior of the colon therebeyond, comprising two individually elongate straight tubular units joined with their axes end to end, a proximal one of said units being rigid and of sufficient length to house an entrance passageway reaching through the sigmoid flexure of an adult and having a terminal opening for admitting surgical instruments to said passageway, and a distal one of said units having a circumferentially continuous tubular wall of stretch inhibiting material forming and completely encompassing a continuation of said passageway, said tubular wall having relatively movable components operative to permit without gaps an enlargement of the girth of said distal unit, and actuating means occupying said passageway operatively related to the components of said tubular wall and extending therefrom to said terminal opening for manipulation thereat in a manner to cause and control said enlargement of girth of said distal unit.

2. A surgical instrument as defined in claim 1, in which the said tubular units are coupled together by a hollow hinge joint surrounding at all times the said passageway and said continuation thereof and enabling each of said units to swing bodily as a whole relatively to the other unit in a manner to maintain their said axes in a common plane and vary the degree of angular inclination of said axes in said plane without occurrence of gap between said units.

3. A surgical instrument of the procto-sigmoidoscope type adapted for smooth insertion through the sigmoid flexure and affording enlargeable access to the interior of the colon therebeyond, comprising two individually elongate straight tubular units joined with their axes end to end, a proximal one of said units being rigid and of sufficient length to house an entrance passageway reaching through the sigmoid flexure of an adult and having a terminal mouth for admitting surgical instruments to said passageway, and a distal one of said units having a circumferentially continuous tubular wall of stretch inhibiting material forming and completely encompassing a continuation of said passageway, said tubular wall having mutually overlapping and relatively slidable sections permitting without gaps an enlargement of the girth of said distal unit, and actuating means occupying said passageway operatively related to said sections and extending therefrom to said terminal opening for manipulation thereat in a manner to cause and control said enlargement of girth of said distal unit.

4. A surgical instrument as defined in claim 3, in which the said tubular units are coupled together by a hollow spherical hinge joint surrounding at all times the said passageway and continuation thereof and enabling each of said units to swing bodily as a whole relatively to the other unit in a manner to maintain their said axes in a common plane and vary the degree of angular inclination of said axes in said plane without occurrence of gap between said units.

5. A surgical instrument as defined in claim 4, in which the said actuating means comprise a rigid camming ring confined to and mounted to slide within said distal unit axially thereof, and a flexible push-pull element connected to and extending from said ring past the said hinge joint and through the said proximal unit, and each of the said sections carries a cam surface internally of said distal unit in operable engagement with said camming ring, said cam surfaces being inclined relatively to the axis of said distal unit in directions to cause all of said sections to slide relatively to each other when said ring wipes against said cam surfaces in an axial direction.

6. A surgical instrument as defined in claim 5, in which the said hinge joint has a pivotal axis in diametric relation to the said tubular units and intersecting both of the said relatively inclinable axes of the said tubular units.

7. A surgical instrument as defined in claim 5, in which the said push-pull element is sufficiently slender to be free for substantial lateral movement within the cross sectional areas of said tubular units and approximately intersects the said pivotal axis of the said hinge joint when said units are in straight alignment.

8. A surgical instrument as defined in claim 2, together with a flexible fluid conduit extending through the said passageway past the said pivotal joint anchored to both the said distal portion and the said proximal portion of the said tube-like structure in a manner to permit the said enlargement of girth of the latter and the said swinging of said portions relatively to each other.

9. A surgical instrument as defined in claim 2, together with a flexible electrical conductor extending through the said passageway past the said pivotal joint anchored to both the said distal portion and the said proximal portion of the said tube-like structure in a manner to permit the said enlargement of girth of the latter and the said swinging of said portions relatively to each other.

10. A surgical instrument as defined in claim 9, together with a flexible fluid conduit extending alongside the said flexible electrical conductor through the said passageway past the said pivotal joint and likewise anchored to both the said distal portion and the said proximal portion of the said tube-like structure in a manner to permit the said enlargement of girth of the latter and the said swinging of said portions relatively to each other.

11. A surgical instrument of the procto-sigmoidoscope type comprising an elongate hollow open ended articulate structure having an entrance mouth and substantially stiff tubular walls of gapless full circumferential extent throughout the length thereof, said walls forming relatively inclinable proximal and distal portions of the length of said structure, and one of said portions terminating in a rigid ring having permanently sleeved engagement with the other of said portions, a hinge joint formed by said ring and said other portion of said hollow structure coupling said structure portions together for relative swinging movement about a common pivotal axis extending crosswise of and secantly related to said ring and the tubular profiles of said structure portions, whereby a gapless passageway through said hollow structure is completely housed and permanently maintained by said stiff tubular walls at all angles of relative inclination of said proximal and distal portions of the instrument.

12. A surgical instrument as defined in claim 11, in which the said hinge joint comprises two coaxially aligned hinge pins each penetrating the wall of said ring and the said tubular wall of one of the said portions of the said elongate structure, said pins being spaced sufficiently apart crosswise of the said passageway to clear the same.

13. A surgical instrument as defined in claim 12, in which the overall length of each of the said hinge pins is confined to the combined thickness of the said wall of the said ring and the said tubular wall of the said structure portion that is penetrated by said pin.

14. A surgical instrument as defined in claim 11, together with push-pull control means extending entirely within the said passageway through and beyond the said proximal portion of the said elongate structure, said means being operatively connected to the said ring beyond said proximal portion and having a handle accessible for manual operation at the said entrance mouth of the instrument to control the said angle of inclination of said distal to the said proximal portion.

15. A surgical instrument as defined in claim 14, in which the said push-pull control means comprises a rod, and slide bearings on the internal surface of the said proximal portion of the said elongate structure in which said rod is longitudinally guided, said rod being flexibly attached to the said ring at a lever arm distance from the said axis of the said hinge joint.

16. In combination with a surgical instrument as defined in claim 11, a withdrawable obturator temporarily installed in the said hollow structure during insertion thereof in a body cavity, comprising a plug-shaped head free to slide in a rectilinear path within the said distal portion of said structure and to project outward therefrom in said rectilinear path, and an articulate relatively slender obturator impelling push-pull rod comprising two lengthwise sections of sufficient combined length to extend from said head to the said entrance mouth of the said proximal portion of the instrument, together with a hinge joint connecting said sections of said slender rod in end to end relatively swingable relation in the close neighborhood of the said ring for maintaining the obturator impelling push-pull function of said rod while accommodating the swinging of said proximal and distal portion of said tube-like structure to varied angular relationships.

17. In combination with a surgical instrument and obturator as defined in claim 16, a handle and mounting device on the end of the said obturator impelling rod at the said entrance mouth of the said tube-like structure, said handle being substantially smaller than the area of opening through said entrance mouth, and said mounting device comprising a bar of substantially less area than said entrance mouth and sufficiently long to span said mouth crosswise, said bar being lodgeable in the borders of said mouth, whereby to leave an open space laterally of said bar for sighting into the instrument through said mouth.

18. In combination with a surgical instrument and obturator as defined in claim 16, a handle and mounting device on the end of the said obturator impelling rod at the said entrance mouth of the said tube-like structure, said handle being substantially smaller than the area of opening through said entrance mouth, and said mounting device comprising a bar of substantially less area than said entrance mouth and sufficiently long to span said mouth crosswise, said bar being lodgeable in the borders of said mouth whereby to leave an open space laterally of said bar for sighting through said mouth, together with a rod centralizing disc of transparent material carried on the said rod at a point in the length thereof within the said proximal portion of said tube-like structure and disposed crosswise thereof, whereby the body cavity lying in advance of the said obturator head can be viewed through the said centralizing disc and past the said head while the instrument is being inserted in a body cavity.

19. A surgical instrument of the procto-sigmoidoscope type affording safe access to the depth of a body cavity comprising, a tube-like structure having an entrance mouth and a gapless elongate passageway therethrough, and having a proximal portion of its tubular length adapted for partial insertion in the body cavity, and having an open ended distal portion of its tubular length adapted for full insertion in the body cavity and inclinable relatively to said proximal portion, a pivotal joint at the junction of said proximal and distal portions of said tube-like structure forming a hinge connection coupling said portions together and comprising a spherical socket member slidably engaged with a hollow spherical ball member, both of said members encompassing said passageway in a manner enabling said portions of the length of said tube-like structure to swing relatively to each other about a pivotal axis located in diametrical relation to said tube-like structure to variable degrees of angular inclination.

20. A surgical instrument as defined in claim 19, in which the said pivotal joint comprises two coaxially aligned hinge pins penetrating the said spherical socket member and the said spherical ball member and spaced sufficiently apart diametrically of the said passageway to clear the same.

References Cited in the file of this patent

UNITED STATES PATENTS

| | | |
|---|---|---|
| 52,014 | Bartlett | Jan. 16, 1866 |
| 58,709 | Worrall | Oct. 9, 1866 |
| 218,055 | Nitze | July 29, 1879 |
| 1,453,975 | Greenberg et al. | May 1, 1923 |
| 1,624,716 | Cerbo | Apr. 12, 1927 |
| 1,959,127 | Duerme | May 15, 1934 |
| 2,922,415 | Campagna | Jan. 26, 1960 |

FOREIGN PATENTS

| | | |
|---|---|---|
| 268,204 | Italy | Oct. 7, 1929 |